United States Patent [19]

Griffey

[11] Patent Number: 4,887,479
[45] Date of Patent: Dec. 19, 1989

[54] BALL CAGE FOR HELICAL BALLSPLINE

[75] Inventor: Edwin K. Griffey, Selma, Ind.
[73] Assignee: Sundstrand Corporation, Rockford, Ill.
[21] Appl. No.: 225,022
[22] Filed: Jul. 26, 1988
[51] Int. Cl.$^4$ .............. F16H 25/22; B64C 13/34; G08B 21/00
[52] U.S. Cl. .............. 74/424.8 NA; 74/424.8 B; 74/459; 244/75 R; 244/213; 340/672; 464/23; 464/160
[58] Field of Search ............... 74/424.8 B, 424.8 NA, 74/459; 116/282; 244/75 R, 213; 340/671, 672; 464/23, 160

[56] References Cited

U.S. PATENT DOCUMENTS

| | | | |
|---|---|---|---|
| 2,690,683 | 10/1954 | Schottler | 74/459 |
| 2,711,655 | 6/1955 | Schottler | 74/459 |
| 2,739,491 | 3/1956 | Russell | 74/459 |
| 3,935,754 | 2/1976 | Comollo | 244/203 X |
| 3,986,689 | 10/1976 | Maltby | 464/160 X |
| 4,688,744 | 8/1987 | Aldrich | 74/411 X |
| 4,730,503 | 3/1988 | Rosenthal | 74/89.15 X |

*Primary Examiner*—Allan D. Herrmann
*Attorney, Agent, or Firm*—Antonelli, Terry & Wands

[57] ABSTRACT

A ball cage for a helical ballspline of a mechanical movement device comprises a cage in the form of a tubular sleeve adapted to be arranged between a helically threaded inner member and a complimentary helically threaded outer member of the helical ballspline. The inner and outer members are displaceable relative to one another along a helical path formed by the threads thereof. The tubular sleeve of the ball cage includes a plurality of ball pockets formed therein for accommodating thrust transmitting balls of the ballspline arranged in the helical path. Two slots are formed in the ball cage for cooperation with respective pins fixed on the inner and outer members of the ballspline for axially and rotatably translating the ball cage with respect to both the inner and outer members during relative displacement of the inner and outer members for guiding the cage in a helical movement corresponding to a rolling movement imparted to the balls by relative displacement between the inner and outer members of the ballspline.

11 Claims, 5 Drawing Sheets

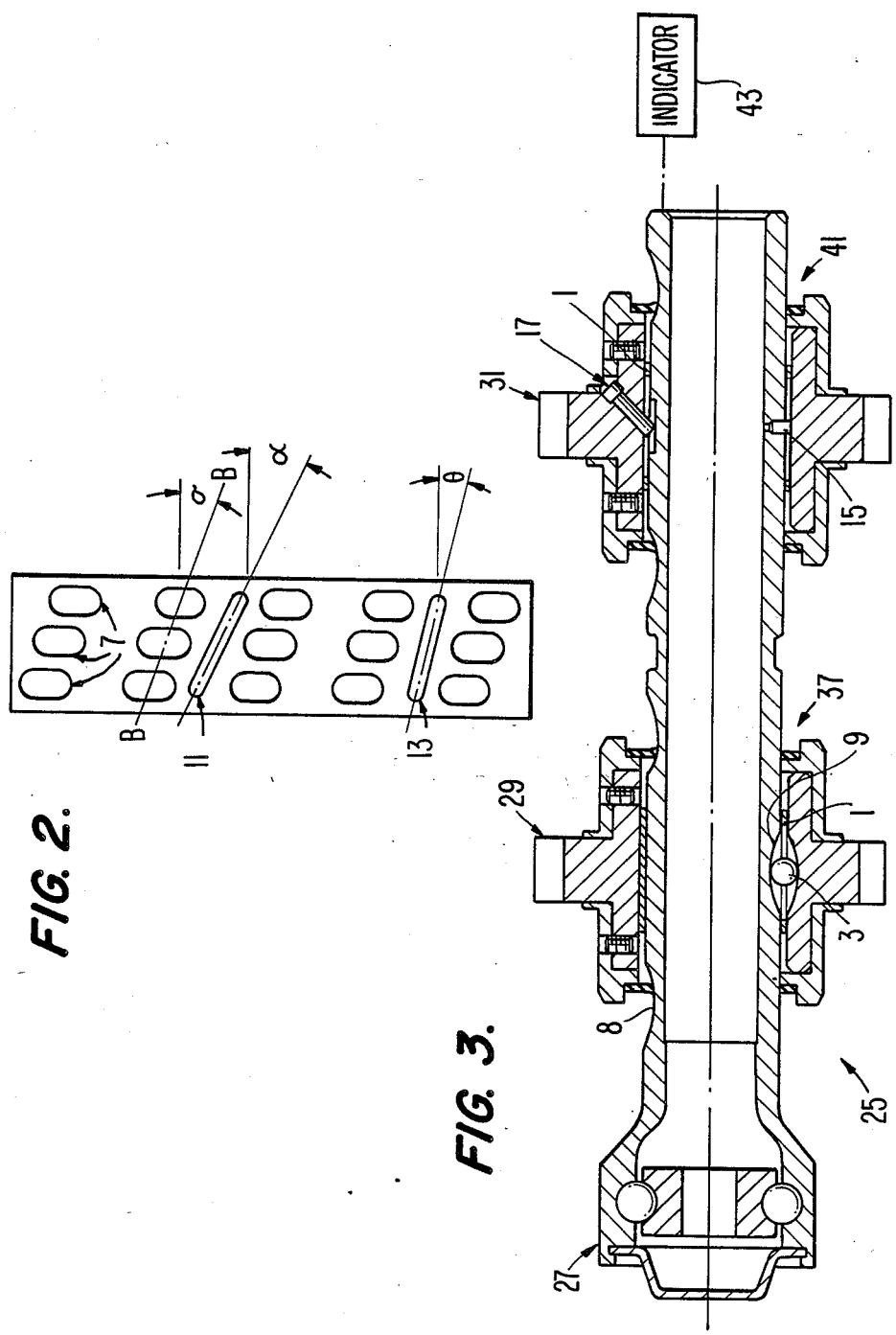

BALL CAGE FOR HELICAL BALLSPLINE

DESCRIPTION

1. Technical Field

The present invention is directed to an improved ball cage for a helical ballspline and a mechanical movement device employing the same. The device can be used in a system for detecting and indicating a failure in one of first and second axially aligned driven shafts rotating in the same direction.

2. Background Art

A ballscrew or helical ballspline assembly normally requires a ball recirculation track so that the balls can continuously roll along the ball track without sliding. The recirculation track requires additional diametrical space and increases the weight of the assembly.

A helical ballspline with relatively short stroke can utilize a sleeve-type cage to control ball movement and spacing, in lieu of the ball recirculation track. The ball cage must translate accurately in relation to the ballspline shaft and the ball movement.

U.S. Pat. Nos. 2,690,683; 2,711,655 and 2,739,491 disclose ball bearing screw devices employing known ball cages.

3. Disclosure of Invention

An object of the present invention is to provide an improved ball cage and a helical ballspline employing the same which enable the ball cage to be translated accurately in relation to a ballspline shaft The mechanical movement device of the invention comprises two helical ballsplines according to the invention. The ballsplines are located at respective portions of a single ballscrew shaft between respective ones of first and second rotating input members which are axially fixed with respect to the ballscrew shaft. The pitch of the helical threads of the respective ballsplines are in opposite directions so that relative rotation between the respective rotating input members about the ballscrew shaft results in linear translation of the ballscrew shaft along its axis. The mechanical movement device is particularly useful in as a system for detecting and indicating a failure in one of first and second axially aligned driven shafts rotating in the same direction. In this system, the mechanical movement device is combined with indicating means for detecting movement of the ballscrew shaft.

These and other objects, features and advantages of the present invention will become more apparent from the following description when taken in connection with the accompanying drawings, which show, for purposes of illustration only, one preferred embodiment in accordance with the present invention.

BRIEF DESCRIPTION OF DRAWINGS

FIG. 2 is a plan, roll-out view of the ball cage of FIG. 1 illustrating the ball pockets and slots for a ballscrew pin and a ballnut pin;

FIG. 3 is a cross-sectional view taken along the axis of rotation of a mechanical movement device employing two ball cages and helical ballsplines according to the present invention;

BEST MODE FOR CARRYING OUT THE INVENTION

Figure 1:
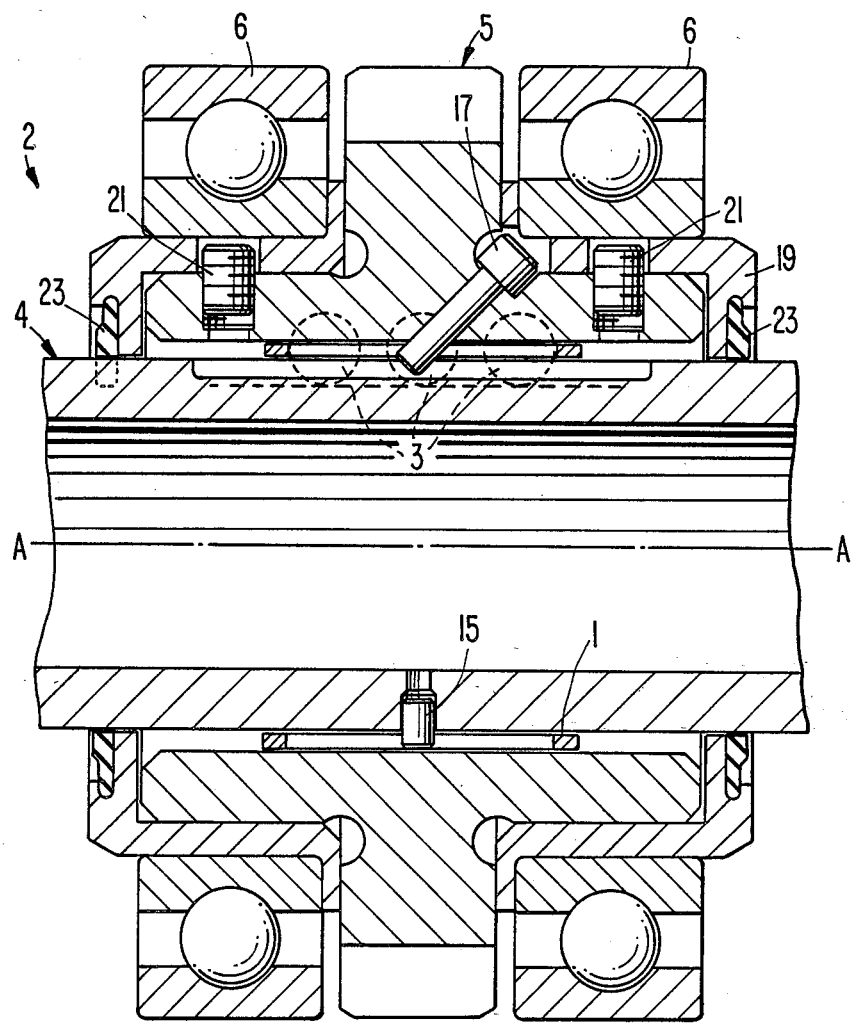
FIG. 1 is a cross-sectional view taken along the axis of rotation of the improved ball cage and helical ballspline of the invention located between a ballscrew shaft and a gear-ball nut of a mechanical movement device according to the invention.

Referring now to the drawings, a ball cage 1 according to the invention is shown in use with a helical ballspline 2 for controlling the movement and spacing of thrust transmitting balls 3 of the ballspline 2. Specifically, the ball cage 1 is arranged between a helically threaded inner member in the form of ballscrew shaft 4 and a complimentary helically threaded outer member in the form of a gear-ballnut 5. The gear-ballnut 5 is supported for rotation about an axis of rotation A—A of the ballspline 2 by means of bearings 6. The bearings 6 on respective sides of the gear-ballnut 5 prevent axial movement of the gear-ballnut 5 along the axis A—A while and a ball nut of the ballspline thereby avoiding excessive wear of the cage and skidding of the thrust transmitting balls of the ballspline.

A further object of the invention is to provide a mechanical movement device which employs two helical ballsplines according to the present invention for producing linear movement of an output member in response to relative rotation of two input members. The mechanical movement device can be used in a system for detecting and indicating a failure in one of first and second axially aligned driven shafts rotating in the same direction. A system of this type with which the device of the invention can be used is disclosed in the commonly assigned U.S. Pat. application Ser. No. 135,456, filed Dec. 21, 1987.

These and other objects are attained by the present invention wherein the improved ball cage thereof for controlling ball movement and spacing in a helical ballspline comprises cage means adapted to be arranged between a helically threaded inner member and a complimentary helically threaded outer member of a helical ballspline which are displaceable relative to one another along a helical path formed by the threads thereof, for accommodating thrust transmitting balls of the helical ballspline arranged in the helical path. According to the invention, for accurate translation of the ball cage the cage means includes means for axially and rotatably translating the cage means with respect to both the inner and outer members of the ballspline during relative displacement of the inner and outer members for guiding the cage means in a helical movement corresponding to a rolling movement imparted to the balls by relative displacement between the inner and outer members of the helical ballspline.

In the disclosed preferred form of the invention, the means for axially and rotatably translating the cage means comprises two slots in the cage means for cooperating with respective pins fixed on the inner and outer members of the helical ballspline. The two slots each extend in the general direction of the helical path. More particularly, to provide for accurate translation of the ball cage, one of the slots extends in a direction which is greater than the lead angle of the helical path of the ballspline while the other of the two slots extends in a direction which is less than the lead angle of the helical path with respect to the axis of rotation of the inner and outer members of the ballspline.

In the disclosed, preferred form of the invention the cage means is in the form of a tubular sleeve with the thrust transmitting balls of the ballspline being accommodated in a plurality of pockets formed through the entire wall thickness of the sleeve. The helical threads and the helical path defined thereby in the ballspline extend at a lead angle $\sigma$ with respect to the axis of rotation of the inner and outer members of the ballspline. The first slot in the ball cage extends at an angle $\alpha$ with respect to this axis of rotation which is greater than $\sigma$ and the second slot in the ball cage extends at an angle $\theta$ with respect to the axis of rotation which is less than $\sigma$. Preferably, the relationship of the angles of the two slots and that of the helical path are related according to the equation:

$$\text{Tan } \alpha = 2 \text{ Tan } \sigma - \text{Tan } \theta.$$

permitting rotation of the gear-ballnut about the axis A—A.

The ball cage 1 in the disclosed embodiment is in the form of a tubular sleeve formed of metal. In the roll-out view of FIG. 2, the ball cage 1 has been cut in a direction along the axis A—A and rolled out flat for illustration purposes. As seen therein, the ball cage 1 comprises a plurality of pockets 7 for accommodating respective thrust transmitting balls 3 arranged in a helical path in the ballspline 2 formed by the helical threads 8 and 9, see FIG. 3, formed in the ballscrew shaft 4 and gear-ballnut 5, respectfully. The ballscrew shaft 4 and the gear-ballnut 5 are displaceable relative to one another along this helical path by relative rotation of the shaft 4 and gear-ballnut 5. This relative rotation also involves axial displacement of the ballscrew shaft and gear-ballnut with respect to one another along the axis of rotation A—A. Since the gear-ballnut 5 is prevented from moving axially by the bearings 6, relative rotation between the shaft 4 and gear-ballnut 5 results in axial translation of the shaft 4. During the relative displacement between the ballscrew shaft 4 and gear-ballnut 5, the thrust transmitting balls 3 roll along the helical path defined between the shaft and gear-ballnut.

The lead angle $\sigma$ of the helical thread or path in the helical ballspline 2 with respect to the axis of rotation A—A is 19.242° in the disclosed embodiment. Each series of three pockets 7 in the ball cage 1 as shown in FIG. 2 are spaced from one another in a direction along the helical path of the ballspline 2, that is, the direction B—B shown in FIG. 2 makes an angle $\sigma$ with the axis of rotation A—A which is the same as the lead angle of the threads of the ballspline. The ball pockets 7 are each elongated in direction transverse to the direction of the helical threads 8 and 9 to allow the balls to properly position themselves within the grooves defined by the threads. The ball cage 1 surrounds the thrust transmitting balls 3 accommodated in the pockets 7 thereof but allows the free and slipless rolling motion of the balls along the helical path while controlling the ball movement and spacing of the balls in the ballspline. Because the width of the pockets 7 is only slightly greater than the diameter of the thrust transmitting balls 3, the balls 3 have a diameter 0.1875 inch in the disclosed embodiment, the ball cage 1 must be translated with the rolling movement of the balls 3 to prevent the balls from skidding and wearing against the side of the cage 1. For this purpose, according to the present invention, the ball cage 1 is provided with two slots 11 and 13 which cooperate with respective pins 15 and 17 which are respectively fixed to and protrude from the outside diameter of the ballscrew shaft 4 and the inside diameter of the gear-ballnut 5. The slots 11 and 13 are approximately equal in width to the pin diameters and extend completely through the wall of the ball cage. The slots 11 and 13 are located so as to accept the respective pins 15 and 17.

The slots 11 and 13 each extend in the general direction of the helical path followed by the balls 3 of the ballspline 2. More particularly, the angular position or direction of the slots in relation to each other and in relation to the ball pockets is controlled to produce the required relative accurate ball cage translation. Specifically, the slot 11 which accepts the pin 15 of the ballscrew shaft 4 extends linearly in the tubular sleeve of the ball cage 1 in a direction which makes an angle $\alpha$ with respect to the rotation axis A—A which is greater than the lead angle $\sigma$ of the helical thread of the ballspline 2. Where $\sigma$ is 19.242° as referred to above, the angle $\alpha$ is 25.04°. The significant difference in an angle $\alpha$ as compared with the angle $\sigma$ offers the advantage of accurate control of movement of the ball cage in relation to the ballscrew. However, the difference in the angles is not so great as to cause the slot to run into the adjacent ball pockets 7 or take up an undesirably large amount of space in the ball cage 1.

The slot 13 which accepts the pin 17 of the gear-ballnut 5 extends linearly in the ball cage 1 in a direction which forms an angle $\theta$ with respect to the axis A—A which is less than sigma $\sigma$. In the disclosed embodiment, $\theta$ is equal to 13.00° where, as noted above, $\sigma$ is equal to 19.242°. The angles $\sigma$, $\alpha$ and $\theta$ are necessarily related to one another as discussed above to insure accurate translation of the ball cage during relative displacement of the ballscrew shaft 4 and gear-ballnut 5. It has been found that for accurate translation, the angles should be related according to the equation $$\text{Tan } \alpha = 2 \text{ Tan } \sigma - \text{Tan } \theta$$

with an acceptable tolerance for the angles being ±0.1°, for example, and where $\theta$ can never equal $\sigma$. The two slots 11 and 13 when used in the helical ballspline 2 an described above constitute means for axially and rotatably translating the ball cage 1 with respect to both the ballscrew shaft 4 and the gear-ballnut 5 during relative displacement of the shaft and gear-ballnut for guiding the cage in a helical movement corresponding to a rolling movement imparted to the balls 3 by relative displacement between the shaft 4 and the gear-ballnut 5 of the helical ballspline 2.

The helical ballspline 2 in the disclosed embodiment has a relatively short stroke wherein the maximum rotation of the gear-ballnut 5 in relation to the ballscrew shaft 4 is 40° which produces a onehalf inch stroke of the ballscrew shaft 4 along the axis of rotation A—A. The components of the helical ballspline 2 including the ball cage 1, thrust transmitting balls 3, ballscrew shaft 4 and gear-ballnut 5, are formed of conventional materials, preferably metal. In the disclosed embodiment, the ball cage is formed of sheet metal having a thickness of 0.03 inch. The outside diameter of the tubular sleeve of the ball cage 1 is 1.030 inch and the width of the ball cage is 0.820 inch.

As shown in FIG. 1, the gear-ballnut 5 is connected to a seal housing 19 by way of set screws 21. The seal housing 19 carries seals 23 at its respective ends which encode the shaft 4 to keep dust out of the helical ballspline 2 and grease within the area of the ballspline. The helical threads 8 and 9 of the shaft 4 and gear-ball nut 5 have a pitch diameter of 1.000 inch in the disclosed embodiment.

A mechanical movement device 25 according to the invention is illustrated in FIG. 3. The device 25 comprises a single ballscrew shaft 27 which cooperates with a pair of spaced gear-ballnuts 29 and 31 by way of respective helical ballsplines 37 and 41 of the type illustrated in FIGS. 1 and 2 of the drawings except that the pitch of the threads of the ballsplines 37 and 41 are opposite to each other. Bearing, not shown, like bearing 6 in FIG. 1, permit rotation of the gear-ballnuts 29 and 31 while preventing axial translation thereof. As a result, relative rotation between the rotating gear-ballnuts 29 and 31 results in axial translation of the ballscrew shaft 27 by an amount which is the sum of the strokes of the each of the ballsplines 37 and 41. The axial translation of the ballscrew shaft 27 can be detected by an indicator 43 shown schematically in FIG. 3.

The mechanical movement device 25 employing a pair of the helical ballsplines with ball cages according to the present invention can be used in a shaft failure indicator in a system for driving actuators in an airframe as illustrated in FIGS. 4-7.

Figure 4:
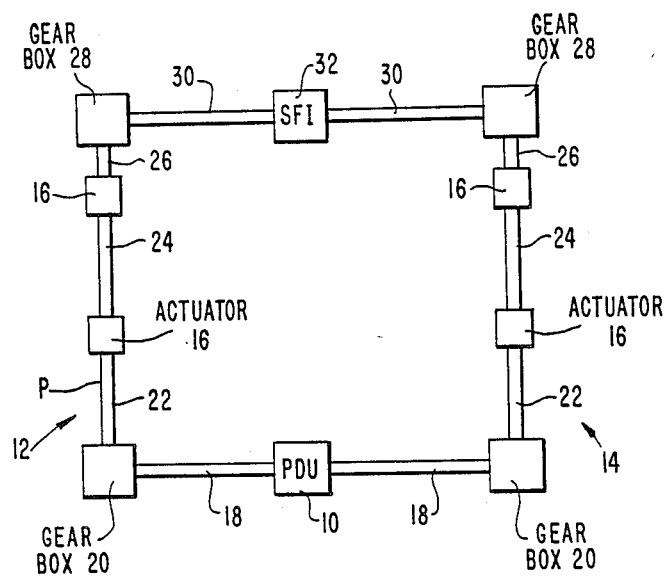
FIG. 4 illustrates a block diagram of a system for driving actuators in an airframe which is particularly suitable for utilization of the present invention.

In particular, FIG. 4 illustrates a block diagram of a system in which the present invention can be used. The system powers various actuators in an airframe by two driven drivelines. The system of FIG. 4 includes a power drive unit 10 (PDU) having a pair of outputs for applying torque to drivelines 12 and 14 respectively. Each of the drivelines 12 and 14 contains one or more actuators 16 which may be devices for closing cargo doors on an aircraft, flaps on the wings of an aircraft, or other devices requiring power. The power drive unit 10 may be a hydrostatic motor for producing output torque applied to drivelines 12 and 14 which is powered from a pressurized source of hydraulic fluid. It should be understood that the PDU 10 contains a brake for braking the rate of rotation of the rotating element within the hydrostatic motor which is activated to slow the motor down and further that stoppage of the hydrostatic motor is accomplished by disconnection of the pressurized hydraulic source fluid from the rotary element contained in the power drive unit while braking force is applied. The stopping of the PDU 10 quickly under full load can produce a torque wave which is transmitted through the drivelines 12 and 14 that can produce a false indication of shaft failure. The driveline 12 includes a first drive shaft 18, a gear box 20 for changing the direction of the torque transmitted by the first drive shaft 18 to a second direction, a second drive shaft 22 which drives an actuator 16, a third drive shaft 24 which is connected between the output of the first actuator 16 and the input to a second actuator 16, a fourth drive shaft 26 which is connected between the second actuator 16 and a gear box 28 for changing the direction of torque transmitted by the fourth drive shaft 26 from a first direction to a second direction, a fifth drive shaft 30 connected between the output of the gear box 28 and a shaft failure indicator 32 employing the mechanical movement device of the invention as described below. Similarly, the second driveline 14 contains the same elements described above with reference to the first driveline 12 which are identified by like reference numerals and are therefore not specifically discussed.

The system of FIG. 4 will continue to operate if there is a failure in either of one of the drivelines 12 or 14. In other words, each of the actuators 16 can be driven from torque transmitted from either direction or from both directions simultaneously. The redundancy in the torque drive provided by the first and second drivelines 12 and 14 to each of the actuators 16 is for purposes of preventing a catastrophic failure of an airframe as a consequence of one of the two drivelines failing. For example, if driveline 12 has a break within the second drive shaft 22 at point P, torque will be transmitted by the power drive unit in a counterclockwise direction so that the actuator 16, which is normally driven by the second driveline 22, receives torque from the third drive shaft 24. In the normal mode of operation, each of the drivelines 12 and 14 is driven at precisely the same speed so that the fifth drive shafts 30 of the first and second drivelines 12 and 14 are rotating at precisely the same speed and in the same direction so that there is no relative motion between them.

Through dynamic analysis of the system illustrated in FIG. 4, the assignee discovered that false shaft failure indications were produced by a shaft failure indicator 32 designed by the assignee as a consequence of not having any mechanism from preventing high torque perturbations from tripping the shaft failure indicator 32. It was discovered that if an electronic sensor rotationally coupled to the system driveline, for producing a signal to shut down the application for hydraulic fluid to the PDU 10 prior to the actuator coming to rest at a final position failed, a full force impact of the system on the PDU mechanical stop caused high torque perturbations in the driveline which was sensed by the shaft failure indicator 32 as a false indication of shaft failure. The shaft failure indicator had a jaw clutch which permitted a free zone of rotation through a predetermined relative angular rotation, such as 30 degrees, without transmitting torque from one of the fifth drive shafts 30 to the other of the fifth drive shafts within the free zone of rotation and further transmitted torque from one of the fifth drive shafts to the other of the fifth drive shafts when relative rotation between them occurred which was equal to the predetermined relative angular rotation so that no further free zone of motion existed.

It was discovered that the false shaft failure indications could be eliminated by having high torque loads directly transmitted between the fifth drive shafts 30 without relative rotation therebetween by means of a hydraulic retarding mechanism for retarding motion of a movable member which activated the failure indicator as described below in detail.

Figure 5:
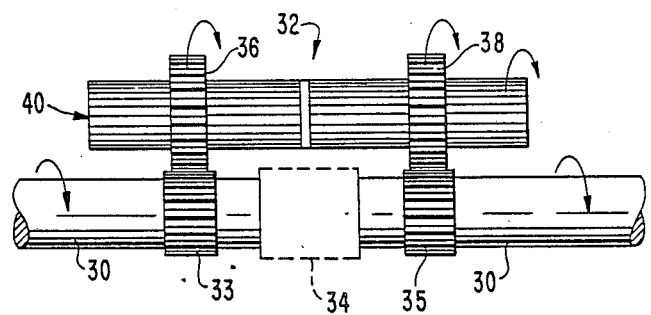
FIG. 5 is a simplified side elevation illustrating the relationship between first and second drive shafts and a movable member which is moved in response to relative rotation of the first and second shafts with respect to each other.

FIG. 5 illustrates a simplified partial diagram of the shaft failure indicator 32. During normal operation, the fifth drive shafts 30 are rotated in the same direction at precisely the same rotational velocity so that no relative rotational movement occurs between the fifth drive shafts. A jaw clutch shown schematically at 34, of any conventional design, is coupled between the fifth drive shafts 30. The jaw clutch has a free zone of free relative rotation between the fifth drive shafts such as 30 degrees in which no torque is transmitted between one of the fifth drive shafts 30 and the other of the fifth drive shafts for relative movement within the free zone of rotation. During normal operation, the jaw clutch operates such that it is within the aforementioned 30-degree zone of free rotation. Furthermore, when a 30-degree relative motion occurs between the fifth drive shafts 30, the jaw clutch 34 fully transmits torque from one of the fifth drive shafts to the other of the fifth drive shafts which occurs upon a failure in one of the first and second drivelines 12 and 14. Each of the fifth drive shafts 30 has a plurality of straight splines. Gears 33 and 35 are attached to the fifth drive shafts 30 in an axially fixed position by means of the splines in accordance with the embodiment of FIG. 6. The gear 33 drives gear 36 and the gear 35 drives gear 38. The first gear 36 is held in a fixed position with respect to the axis of the left-hand fifth drive shaft 30 by a holding mechanism not illustrated. The second gear 38 is held in a fixed position with respect to the axis of the right-hand fifth drive shaft 30 by a holding mechanism not illustrated. Each of the first and second gears 36 and 38 has a cylindrical bore which is helically threaded to form respective helical ballsplines according to the invention with the helically threaded portions 42 and 44 on the outer surface of a shaft 40 as shown in FIG. 16. The cylindrical shaft 40 moves axially in response to differential rotation between the left-hand and right-hand fifth drive shaft 30 turning relative rotary motion into axial motion. The pitch of the threads of the first and second portions 42 and 44 is opposite to each other.

The shaft failure indicator is tripped in response to either leftward or rightward movement of the shaft 40 caused by relative rotation between the left-hand and right-hand fifth drive shafts 30. If the left-hand fifth drive shaft 30 is rotating with a higher velocity than the right-hand fifth drive shaft, the shaft 40 will move to the left and trip the indicator when rotation through the free zone is complete. If the right-hand fifth drive shaft 30 is moving with a faster velocity than the left-hand fifth drive shaft 30, the shaft 40 will be moved to the right and trip the indicator when rotation through the free zone is complete. It should be understood that the shaft failure indicator is tripped by a predetermined degree of axial motion of the shaft 40 to the left or right and further that a hydraulic retarding mechanism is connected to the shaft 40 to retard its movement which prevents high torque loads from causing the fifth drive shafts 30 from moving completely through the predetermined relative angular rotation of the free zone of rotation. The degree of retarding force for restricting axial movement of the shaft 40 is chosen to permit unrestricted rotation of the fifth drive shafts 30 through the free zone of rotation in response to a shaft failure in one of the first and second drivelines 12 and 14 and to prevent substantial rotation through the free zone of rotation in response to high torque loads or perturbations.

Figure 6:
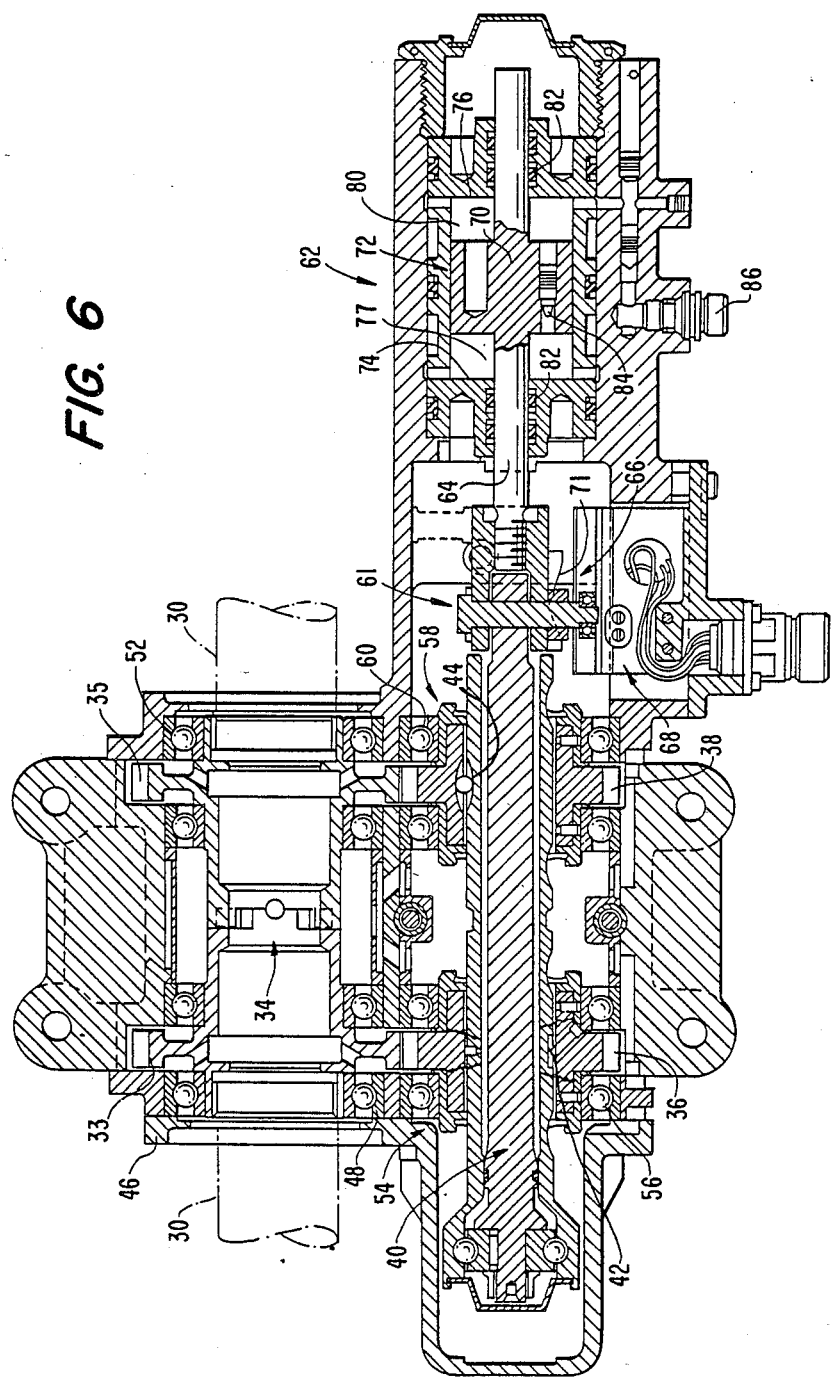
FIG. 6 is a longitudinal cross section of a shaft failure indicator employing the mechanical movement device of the present invention.

FIG. 6 illustrates a detailed longitudinal cross section of a shaft failure indicator for using the improved ball cage, helical ballspline and mechanical movement device of the present invention. Like reference numerals in FIGS. 5 and 6 are used to identify like parts. The indicator of FIG. 6 senses relative rotation between the left-hand and right-hand fifth drive shafts 30 as follows. As explained above, a jaw clutch 34 couples the left-hand and right-hand fifth drive shafts 30 together to permit a free zone of rotation, which in the embodiment as illustrated is 30 degrees, through which torque is not transmitted between the left- and right-hand fifth drive shafts and a complete transmission of torque between the left- and right-hand drive shafts after there has been 30 degrees of relative motion of the one shaft with respect to the other. This relative motion occurs when there is a shaft failure in either the first driveline 12 or the second driveline 14 but there is no torque transmission during normal operation for the reason that the respective left- and right-hand fifth drive shafts 30 are within the free zone of rotation in which no torque is transmitted. The left- and right-hand fifth drive shafts 30 have helical splines (not illustrated) or other mechanical fastening means which connect gears 33 and 35 fixedly to the shaft. Bearing 48 rotatably supports the left-hand fifth drive shaft 30 and is held in a fixed position with respect to the housing 46. The bearing 52 rotatably supports the right-hand fifth drive shaft 30 and is held in a fixed position with respect to housing 46. Torque is transmitted from the gear 33 to the gear 36 and torque is transmitted from the gear 35 to the gear 38. As described above with reference to FIG. 5, each of the gears 36 and 38 have a cylindrical bore containing helical threads or splines. The gear 36 is held in a fixed axial position by a holding mechanism 54 which includes a bearing 56 which rotatably supports shaft 40. Similarly, gear 38 is held in a fixed axial position by a holding mechanism 58 which includes a bearing 60 which rotatably supports shaft 40. It should be noted that the holding mechanisms 54 and 58 are spaced apart by a fixed distance. The screw thread or helical splines contained in the bores of the gears 36 and 38 mate with corresponding threads or helical splines of shaft 40 as illustrated in FIG. 5 for forming helical ballsplines with ball cages according to the invention as illustrated in FIGS. 1–3. As described above with reference to FIG. 5, a differential speed between the rotation of the left- and right-hand drive shafts 30 causes a corresponding left or right axial movement of the shaft 40.

Fig. 6 also illustrates the mechanism for indicating when a shaft failure has occurred and further a hydraulically powered mechanism for retarding the axial movement of the drive shaft 40 with a force which is directly proportional to the speed of movement of the shaft. The shaft 40 has a mechanical coupling 61 which connects the shaft 40 to an axially movable retarding mechanism 62 having a shaft 64 which is joined to the shaft 40. Indicator 66 contains a switch 68 which is closed by movement of a cam surface 71, as described below with reference to FIG. 7, in response to a leftward or rightward movement of the coupling 61 for a fixed distance. Movement of the shaft 40 either to the left or right in response to relative angular movement of the left- and right-hand fifth drive shafts 30 within the free zone of motion causes cam surface 71 to engage an element of the switch after a predetermined amount of motion to signal the occurrence of a fault in one of the first or second drivelines 12 or 14. The amount of motion along the cam surface 66 required to close switch 68 is chosen to be substantially equal to the amount of motion which is produced by relative angular movement of the left- and right-hand fifth drive shafts through the free zone of motion so that closing of the switch occurs substantially simultaneously with the point at which torque is transmitted by the jaw clutch 34 between the left- and right-hand fifth drive shafts 30.

As was described above, the assignee discovered that false tripping signals were produced by an indicator when movement of the shaft 40 was not retarded which has been eliminated by the addition of retarding mechanism 62. The retarding mechanism 62 has a piston 70 integrally formed with the shaft 64. The piston 70 is housed within a cylindrical housing 72 having end walls 74 and 76. The piston 70 and the end wall 74 defines a first chamber 77. The piston 70 and the end wall 76 defines a second chamber 80. Suitable seals such as O rings 82 are provided to prevent fluid leakage around the shaft 64. The retarding force applied against movement of the shaft 40 is proportional to the relative cross-sectional areas of the piston 70 and the orifice 84. The degree of retarding force applied against movement of the shaft 40 is also directly proportional to the rate of movement of the shaft 40. The retarding force applied against movement of the shaft 40 being directly proportional to the rate of relative movement ensures that the high transient torque loads are completely transmitted from one of the fifth drive shafts 30 to the other and do not cause the relative angular position of the left- and right-hand fifth drive shafts 30 to substantially move with respect to each other and permits a slow rate of relative rotation between these drive shafts to occur without substantial transmission of torque from one of the fifth drive shafts to the other in response to a failure in one of the first an second drivelines 12 and 14 which produces a true indication of shaft failure by the indicator 66. Furthermore, high torque perturbations in the drivelines 12 and 14 caused by impacting system mechanical stops with full power applied do not cause a shaft failure indication to be produced by indicator 66 for the reason that these torque perturbations are at least substantially transmitted between the fifth drive shafts 30 by the retarding mechanism 62 by the application of the retarding force to the drive shaft 40. Thus, the retarding mechanism prevents rapid relative movement of the fifth drive shafts 30 with respect to each other through the free zone of motion to prevent false shaft failure indication. It should be further understood that hydraulic fluid is applied to fitting 86 to maintain a sufficient supply of hydraulic fluid to the chambers 78 and 80 of the retarding mechanism 62.

Figure 7:
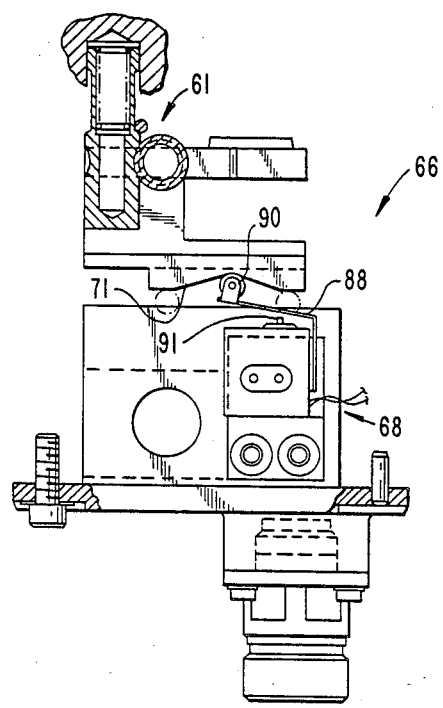
FIG. 7 illustrates the indicator as viewed from the opposite side of FIG. 6.

FIG. 7 illustrates the indicator 66 as viewed from the opposite side of FIG. 6. Like reference numerals are used in FIGS. 6 and 7. The switch 68 includes a member 88 which includes a cam follower 90 which rides on the cam surface 71. Either leftward or rightward movement of the mechanical coupling 60 causes the cam follower 90 to ride up on the slope of the cam surface 71 to force the switching member 88 downward. The switch 68 closes an electrical circuit (not illustrated) when the switch member 88 engages the projection 91.

While I have shown and described only one embodiment in accordance with the present invention, it is understood that the same is not limited thereto, but is susceptible to numerous changes and modifications is known to those skilled in the art. For example, the term helical threads used herein is used in a general sense to encompass helical splines, grooves or other helical configurations which may be used in a ballspline as will be understood by the skilled artisan. Therefore, I do not wish to be limited to the details shown and described herein, but intend to cover all such changes and modifications as are encompassed by the scope of the appended claims.

I claim:

1. A ball cage for controlling ball movement and spacing in a helical ballspline comprising cage means for accommodating thrust transmitting balls of a helical ballspline, said cage means adapted to be arranged between a helically threaded inner member and a complimentary helically threaded outer member of the helical ballspline which are displaceable relative to one another along a helical path formed by the threads thereof with said thrust transmitting balls accommodated by said cage means being arranged in said helical path, said cage means including means for axially and rotatably translating said cage means with respect to both said inner and outer members during relative displacement of said inner and outer members for guiding the cage in a helical movement corresponding to a rolling movement imparted to the balls by relative displacement between the inner and outer members of the helical ballspline.

2. A ball cage according to claim 1, wherein said means for axially and rotatably translating comprises two slots in said cage means for cooperation with respective pins fixed on the inner and outer member of the helical ballspline.

3. A ball cage according to claim 2, wherein said two slots each extend in the general direction of said helical path.

4. A ball cage according to claim 2, wherein said helical path of the ballspline extends at a lead angle $\sigma$ with respect to the axis of rotation of the inner and outer members of the ballspline, a first slot of said two slots in said cage means extends at an angle $\alpha$ with respect to said axis which is greater than $\sigma$, the second slot of said two slots extends at an angle $\beta$ with respect to said axis which is less than $\sigma$.

5. A ball cage according to claim 4, wherein the relationship of the angles of said two slots and said helical path with respect to said axis of the helical ballspline is defined by the equation $$\text{Tan } \alpha = 2 \text{ Tan } \sigma - \text{Tan } \theta.$$

6. A ball cage according to claim 1, wherein said cage means is in the form of a tubular sleeve.

7. A ball cage according to claim 1, wherein said cage means includes a plurality of pockets for accommodating said thrust transmitting balls of the helical ballspline.

8. In a helical ballspline comprising a helically threaded inner member and a complimentary helically threaded outer member which are displaceable relative to one another along a helical path formed by the threads thereof, a plurality of thrust transmitting balls arranged in the helical path between said inner member and said outer member, and cage means arranged between said inner member and said outer member for accommodating said thrust transmitting balls arranged in said helical path, the improvement comprising said cage means including means for axially and rotatably translating said cage means with respect to both said inner and outer members during relative displacement of said inner and outer members for guiding said cage means in a helical movement corresponding to a rolling movement imparted to the balls by said relative displacement between the inner and outer members.

9. A mechanical movement device for linearly moving an output member in response to relative rotation between two rotatable input members which are rotatable about a common axis, said device comprising a ballscrew shaft as said output member, said ballscrew shaft extending along said common axis and including first and second outer portions which are respectively helically threaded, the pitch of the threads of the first and second portions being opposite to each other, first and second complimentary helically threaded outer members as said input members located about respective ones of said first and second portions of said shaft and displaceable relative to said shaft along respective helical paths formed by the threads thereof, a plurality of thrust transmitting balls arranged in said helical paths to form first and second helical ballsplines between said shaft and said first and second outer members, respectively, and first and second cage means arranged between said shaft and said first and second outer members, respectively, for accommodating thrust transmitting balls of said first and second helical ballsplines arranged in said helical paths, said first and second cage means each including means for axially and rotatably translating said cage means with respect to both said shaft and the corresponding outer member during relative rotation of said first and second outer members about said axis for guiding the cage means in helical movements corresponding to rolling movements imparted to the balls in the respective helical ballsplines caused by relative rotation between said first and second outer members.

10. A mechanical movement device according to claim 9, further comprising indicating means for detecting movement of the ballscrew shaft.

11. A mechanical movement device according to claim 9, further comprising means for preventing axial displacement of said first and second outer members.

* * * * *